United States Patent
Delfini et al.

(10) Patent No.: US 8,925,208 B2
(45) Date of Patent: *Jan. 6, 2015

(54) POWER TOOL, IN PARTICULAR A PORTABLE POWER TOOL

(75) Inventors: Stefano Delfini, Bettlach (CH); Thilo Koeder, Gerlingen (DE); Joachim Platzer, Remseck-Hochberg (DE); Ulli Hoffmann, Niefern-Oeschelbronn (DE)

(73) Assignee: Robert Bosch GmbH, Stuttgart (DE)

( * ) Notice: Subject to any disclaimer, the term of this patent is extended or adjusted under 35 U.S.C. 154(b) by 613 days.

This patent is subject to a terminal disclaimer.

(21) Appl. No.: 12/994,842

(22) PCT Filed: Mar. 30, 2009

(86) PCT No.: PCT/EP2009/053709

§ 371 (c)(1),
(2), (4) Date: Jan. 7, 2011

(87) PCT Pub. No.: WO2009/144054

PCT Pub. Date: Dec. 3, 2009

(65) Prior Publication Data

US 2011/0094113 A1 Apr. 28, 2011

(30) Foreign Application Priority Data

May 29, 2008 (DE) .................. 10 2008 002 066

(51) Int. Cl.
*B23D 49/10* (2006.01)
*B23D 51/02* (2006.01)
*B23D 55/08* (2006.01)

(52) U.S. Cl.
CPC ............ *B23D 51/025* (2013.01); *B23D 55/084* (2013.01)

USPC .............................................. 30/392; 30/393

(58) Field of Classification Search
USPC .................................................... 30/392–394
See application file for complete search history.

(56) References Cited

U.S. PATENT DOCUMENTS

| 5,634,277 | A | * | 6/1997 | Wada et al. ..................... 30/392 |
| 2002/0178591 | A1 | * | 12/2002 | Hecht et al. .................... 30/392 |
| 2005/0257385 | A1 | * | 11/2005 | Walker ............................ 30/392 |
| 2006/0060054 | A1 | * | 3/2006 | Delfini et al. .................. 83/697 |
| 2009/0025233 | A1 | * | 1/2009 | Kaiser et al. .................... 30/392 |
| 2009/0126549 | A1 | * | 5/2009 | Dietz et al. ..................... 83/817 |
| 2010/0024226 | A1 | * | 2/2010 | Kaiser et al. .................... 30/392 |

FOREIGN PATENT DOCUMENTS

| DE | 10 2007 005581 | 11/2007 |
| EP | 153895 | * 9/1985 |
| JP | 62 203716 | 9/1987 |
| RU | 2 050 261 C1 | 12/1995 |

(Continued)

OTHER PUBLICATIONS

International Search Report corresponding to PCT Application No. PCT/EP2009/053709, mailed Jul. 27, 2009 (German and English language document) (5 pages).

*Primary Examiner* — Stephen Choi
(74) *Attorney, Agent, or Firm* — Maginot, Moore & Beck LLP

(57) ABSTRACT

The disclosure provides a transverse guide of a saw blade for a machine tool, particularly for a hand-guided machine tool in the form of a band saw or jigsaw, wherein the saw blade can be rotated about the longitudinal axis thereof by way of said guide in the opposite direction to said forces as a function of transverse and/or torsional forces acting on the saw blade.

14 Claims, 4 Drawing Sheets

(56) References Cited

FOREIGN PATENT DOCUMENTS

| | | | |
|---|---|---|---|
| RU | 2 262 422 C2 | 10/2005 | |
| SU | 1454586 A1 | 1/1989 | |
| WO | 02 22297 | 3/2002 | |
| WO | 03 106087 A1 | 12/2003 | |

* cited by examiner

POWER TOOL, IN PARTICULAR A PORTABLE POWER TOOL

BACKGROUND

The invention relates to a power tool, in particular a portable power tool, in the form of a band saw or jigsaw, that includes a transverse guide for the saw blade.

Power tools in the form of jigsaws having such a transverse guide are known, for example, from WO02/22297 A1. In this solution, the transverse guide is arranged in the region of the sole plate of the portable power tool designed as a jigsaw and shortens the free guide length of the saw blade between the saw blade receptacle on the machine side and the sole plate. As a result, the saw blade is stabilized in the transverse direction and its tendency to deflect in the transverse direction is reduced, and the untrue running of the saw blade is also countered as a result. This all helps to avoid deviations from a desired direction of the cut and from desired guidance of the cut and helps to achieve as far as possible good working results.

However, problems associated with the untrue running of the saw blade are only reduced with such systems for transverse guidance.

As has been shown, with respect to a workpiece as material to be cut, the respective saw blade first runs untrue, that is to say it drifts, on the respective underside of the workpiece from the theoretical cutting plane, running through and determined by the top cut edge, with respect to engagement of the saw blade with the workpiece, starting from the top side.

Accordingly, for the user, such untrue running of the saw blade will first become recognizable when the deviation also becomes visible on the top side of the workpiece. There are then already relatively large deviations of the cut edge from the theoretical cutting plane on the underside of the workpiece. It follows from this that, for the user of such a jigsaw placed in position on the workpiece, the untrue running of the saw blade does not become recognizable, and thus the user cannot appropriately intervene, until more pronounced "untrue running" of the saw blade and thus a considerable defect are already present.

There are also corresponding problems in principle in band saws.

SUMMARY

One object of the disclosure, with respect to power tools of the type mentioned above, is to show a further way of countering the untrue running of the saw blade, in particular of at least virtually completely preventing untrue running of the saw blade.

This is achieved according to the disclosure in that the saw blade is rotated about its longitudinal axis in a positively driven manner and/or is twisted with respect to its longitudinal axis via the transverse guide as a function of transverse and/or torsional forces acting on the saw blade, wherein such positively driven rotation or torsion is effected for reducing the untrue running of the saw blade, in particular by rotation or torsion in the direction opposed to the transverse and/or torsional force.

Such a solution can be realized, if need be, in addition to the known transverse guide and transverse support of the saw blade, to be precise with means as are known in conjunction with the known solutions for the transverse guide and transverse support, for example from WO02/22297 A1 or WO03/106087. Therefore, within the scope of the disclosure for the rotation or torsion of the saw blade, guide elements can also be expediently used which act upon said saw blade, in particular are placed against the flat sides at selected points or in a planar manner, wherein minor torsion of the saw blade is especially suitable for flexible band saw blades.

Guide jaws, guide rollers or the like can serve as such guide elements, it being especially expedient to assign the guide elements to supporting arms and to place them via the supporting arms against the flat sides of the saw blade at selected points or in a planar manner. The supporting arms can each be mounted separately as a one-armed lever or can be connected and supported in a common mounting in crossover manner, as is conventional practice in the case of pincers.

The transverse and/or torsional forces can be recorded by the guide elements themselves being designed as measuring elements or by the guide elements carrying measuring elements. Said transverse and/or torsional forces can also be recorded by the torque transmitted via the supporting arms being recorded.

Within the scope of the disclosure, in power tools in which the saw blade is formed by a saw band, the transverse guidance effected as a function of transverse and/or torsional forces acting on the saw blade can preferably be effected on both sides of the working region of the saw blade, such that, for the saw blade, only a band section lying between the guide elements spaced apart in the longitudinal direction of the saw blade forms the section oriented in particular in a straightening manner via the transverse guide, irrespective of the other course of the saw band.

Accordingly, in a guide provided in the longitudinal direction on one side relative to the working region of the saw blade, thus, for example, in jigsaws, it is in particular also possible to record torsional forces, but also transverse forces, via measuring elements spaced apart in the direction of the longitudinal axis.

Within the scope of the disclosure, angles of rotation that are already small, possibly very small, may be sufficient for the desired compensation of the effects leading to the untrue running of the saw blade. Angles of rotation of this order of magnitude occasionally correspond to the rotary play existing in the drive-side guide and/or support of the saw blade, thus in particular to the rotary play existing in the non-rotatable guide of a reciprocating rod supporting the saw blade. Accordingly, work can also be carried out with rotary play. For the reciprocating rod, which lies in the actuating train of the saw blade and guides the saw blade, it may therefore possibly be unnecessary, where there is corresponding production-related rotary play, to attempt to achieve a corresponding degree of freedom in the reciprocating rod guide or in the saw blade guide. Corresponding possibilities are also offered by rotary play existing or deliberately predetermined in the saw blade receptacle.

In addition, it is also within the scope of the disclosure, possibly by specific elasticity in the reciprocating rod guide and/or in the saw blade receptacle, to ensure that, on the one hand, the transverse guide of the saw blade and its orientation with respect to a predetermined rotary position are not impaired, but that, on the other hand, rotation of the saw blade about its longitudinal axis is possible to the extent shown.

The adjustability of the angle of rotation for the saw blade, said adjustability being provided according to the disclosure, by application of transverse force via a transverse support of the saw blade can be used independently of, or possibly also in addition to, that application of transverse force to the saw blade which is predetermined for the correction of the untrue running, in order to correct deviations from the desired or predetermined specified working line during the sawing operation, in particular during the starting cut, possibly also in order to autonomously or semi-autonomously follow those specified working lines which do not cause any relatively large deviations from the straight working direction.

If relatively large deviations from the straight working direction are desired or necessary, the application of rotary force via the transverse support about an axis of rotation lying in the region of the longitudinal axis of the saw blade or coinciding with the latter can also be used, for this purpose, to rotate the saw blade into corresponding angular positions relative to the straight working direction, provided the rotationally fixed securing of the saw blade with respect to its straight working position is neutralized. This is done, for example, by specifically releasing the corresponding degree of freedom, thus, for example, by neutralizing the rotational fixing between saw blade and associated reciprocating rod in the saw blade receptacle or by releasing the rotary position locking for the reciprocating rod.

A further solution for operation of a jigsaw in scrolling mode is therefore also provided according to the disclosure without the need for complicated additional devices.

In conjunction with an arrangement and/or device for following a specified path, for example a sensory recording unit for recording the specified path and a subsequent control device, operation with autonomous or semi-autonomous guidance of the jigsaw can also be realized.

Furthermore, the disclosure relates to a method for a power tool, in particular a portable power tool, in the form of a band saw or jigsaw, in which, as a function of the transverse, rotary and/or torsional force acting on the saw blade, the rotary position of the saw blade is changed to such an extent or the saw blade is twisted to such an extent that untrue running of the saw blade as a result of transverse force is avoided.

BRIEF DESCRIPTION OF THE DRAWINGS

Further advantages and expedient embodiments can be gathered from the description of the figures and from the drawings, in which.

DETAILED DESCRIPTION

Figure 1:
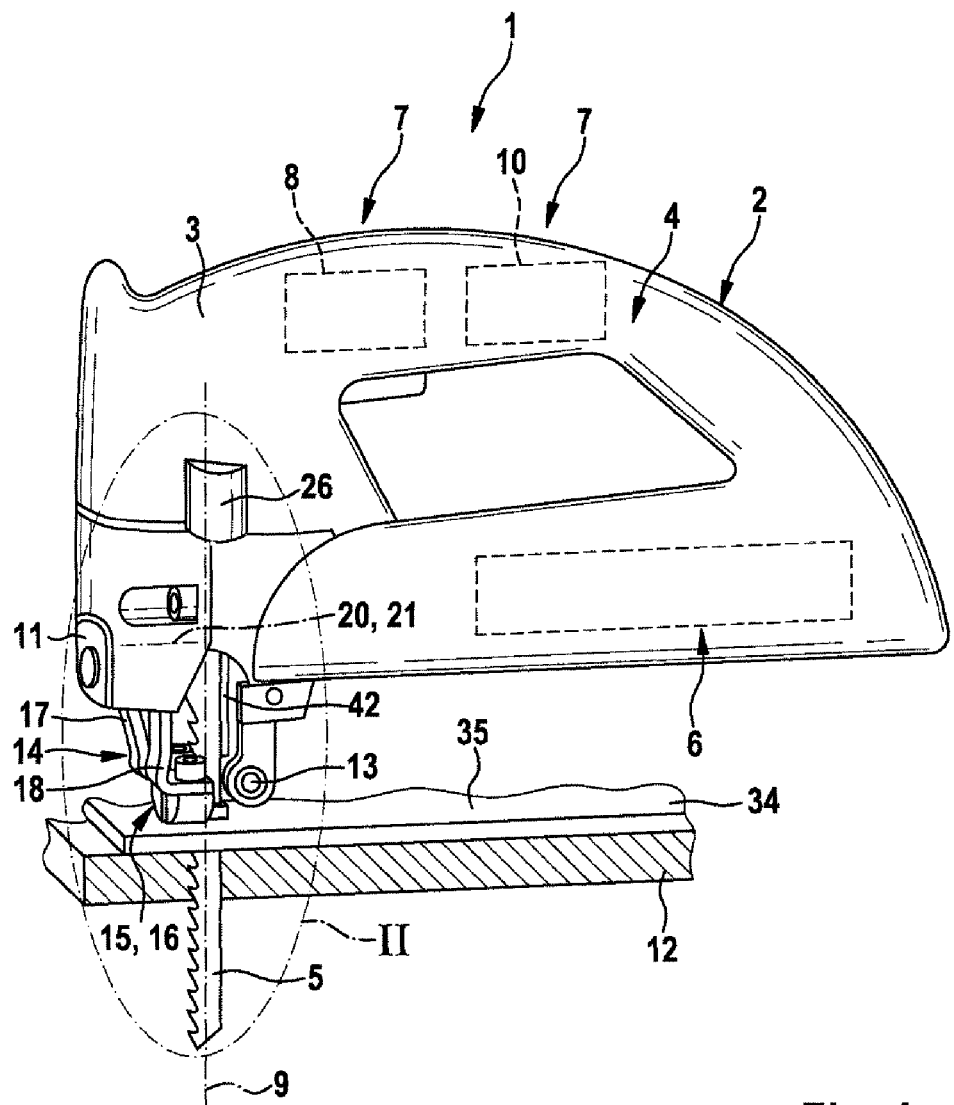
FIG. 1 shows a schematic illustration of a portable power tool in the form of a jigsaw.
Figure 2:
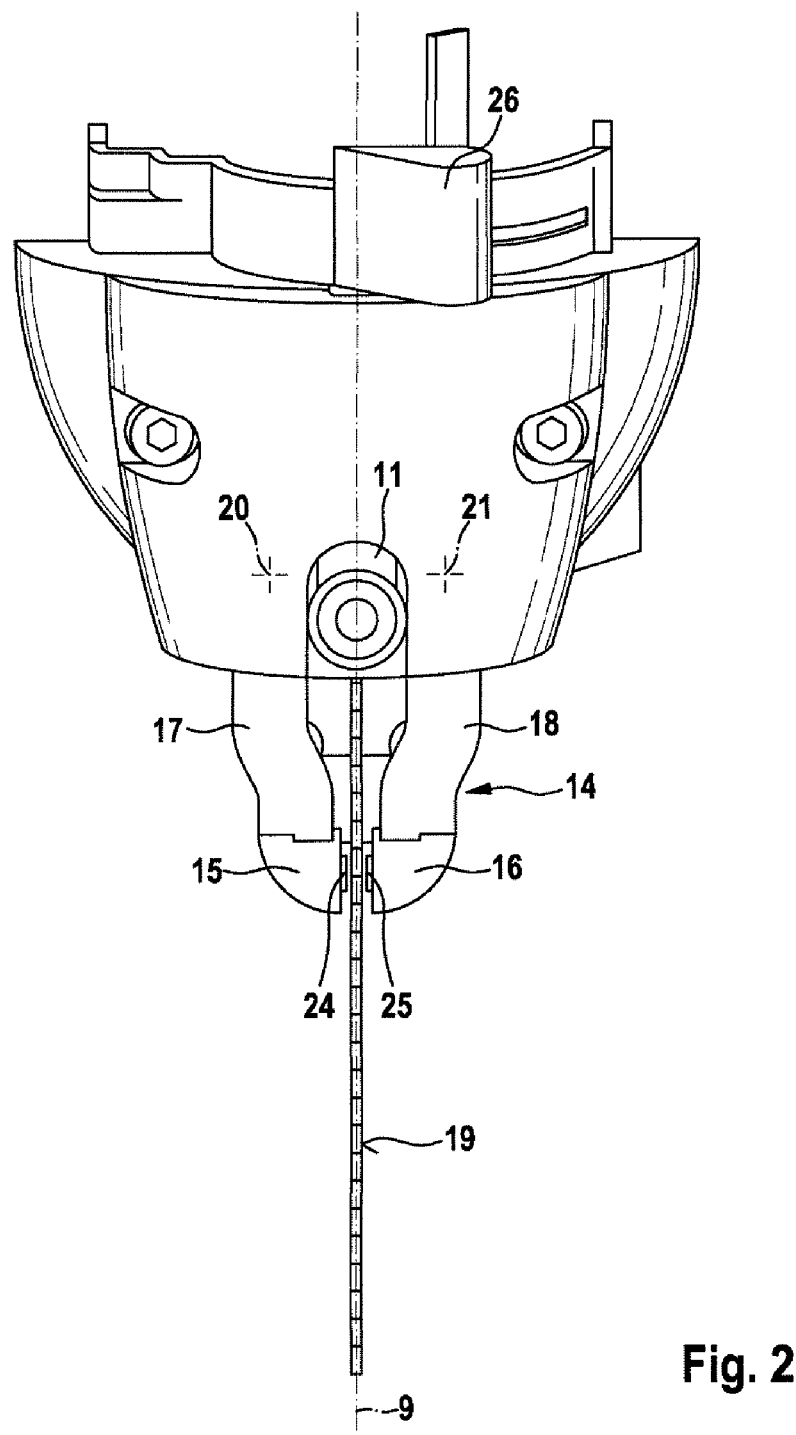
FIG. 2 shows a detail from FIG. 1 of a front view of the jigsaw.

FIG. 1 illustrates a power tool 1 in the form of a portable jigsaw 2 comprising a housing 3 and a handle part 4 which extends in the longitudinal direction of the jigsaw 2 and forms part of the housing 2. On the front side, the jigsaw 2 has a head region in which a saw blade 5 driven with a reciprocating motion is provided as tool. The drive unit, operated by electric motor, for the jigsaw 2 is indicated schematically at 6 and is accommodated by the housing 3. Also provided in the housing 3 are positioning and control means 7, which comprise, inter alia, an actuator system 8 for the rotary adjustment of the saw blade 5 about its longitudinal axis 9 and a computing unit 10 in which, inter alia, results obtained from image monitoring—here illustrated as a sensor system 11, for example designed as a camera—can be processed and converted into positioning commands, inter alia for the actuator system 8.

The sensor system 11 serves to observe the working region of the jigsaw 2 in the zone surrounding the saw blade 5 in the respective engagement position thereof on a workpiece 12 (shown here symbolically). Supporting means 13 act on the rear side of the saw blade 5 close to the point at which it engages with the workpiece 12, which supporting means 13 allow rotation of the saw blade 5 or rotate with the latter and can be formed, for example, by a supporting roller. At the level adjacent to the rear supporting means 13, a transverse guide 14 having guide elements 15, 16 is provided for the saw blade 5, said guide elements 15, 16 being arranged on supporting arms 17, 18, of which are pivotable about axes 20, 21 running parallel to the flat sides 19 of the saw blade 5. Said axes are only indicated schematically and the supporting arms 17, 18 can be adjusted relative to one another transversely to the flat sides 19 of the saw blade 8 about the axes 20, 21 via the actuator system 8 (not shown in any more detail). The guide elements 15, 16 are in this case illustrated as guide jaws which bear against the flat sides 19 of the saw blade 5 via sliding elements 24, 25. It is also within the scope of the disclosure to provide guide rollers as guide elements 15, 16.

The jigsaw 2 can be designed in a known manner as a saw working merely in a straight working direction, wherein the longitudinal axis of the jigsaw 2 and the longitudinal axis 9 of the saw blade 5 lie in the saw blade plane. In particular with this orientation of the saw blade plane, the jigsaw 2 can also be operated in a "pendulum stroke mode", in which the saw blade 5 is additionally driven in a pendulous manner about an axis lying transversely to the blade plane. Furthermore, an operating mode in which the saw blade 5 can be pivoted about its longitudinal axis 9 into working positions at an angle to the longitudinal axis of the machine is also possible.

In the schematically illustrated arrangement, corresponding adjustment positions for the saw blade 5 can also be set in particular in a lockable manner via a slide 26. In this case, the saw blade 9 can be rotated relative to the accommodating head part of the jigsaw 2, a factor which is not shown. The rotary positions which can be fixed in a lockable manner also include the position corresponding to the straight working position.

The jigsaw 2 is provided with a sole plate 34, the arrangement of which in a fixed position relative to the housing 3 is illustrated via a support 35 (only indicated schematically). The sole plate 34 rests on the workpiece 12. In principle, it is also possible to correspondingly directly support the jigsaw against the workpiece 12 via the guide elements 15, 16, given an appropriate configuration of the latter. A rest for the workpiece 12 can be formed, for example, by the surface of a work bench.

In principle, the bench saw 2 shown can also be used as a flush-mounted machine, in which case, with respect to the illustration according to FIG. 1, the jigsaw 2 works in the opposite position with saw blade 5 projecting upward.

During the working operation of the jigsaw 2, with saw blade 5 engaging in the workpiece 12, the saw blade 5 can "run untrue". In the process, the saw blade 5 drifts transversely to the saw blade plane in the region passing through the workpiece 12. This means that the cut surface in the workpiece 12, starting from the application side of the jigsaw as top side, runs obliquely toward the underside of the workpiece 12. The saw blade 5 is therefore deflected laterally in the region passing through the workpiece.

This lateral deflection results in transverse forces, and also torsional forces at least occasionally, which are recorded according to the disclosure, it being possible for said forces to be recorded in the region of the guide elements 15, 16, of the supporting arms 17, 18, or in the region of the mounting thereof (axes 20, 21) via corresponding measuring elements 38, 39 or also via separately arranged sensors. Such measuring elements are indicated symbolically in FIG. 3 as measuring elements 38 integrated into the supporting elements 15, 16. However, it is also possible to provide corresponding measuring elements 39, likewise indicated symbolically in FIG. 3, in parts of the guide and support that are assigned thereto, thus, for example, to integrate them into the supporting arms 17, 18 or to assign them to the supporting arms 17, 18. The arrangement according to FIG. 3 also illustrates, for the measuring elements 39, the position thereof, for example as measuring elements recording the torque, in or about the axes 20, 21 of the supporting arms 17, 18. In principle, the recording is evenpossible in the associated positioning actuator system.

Figure 3:
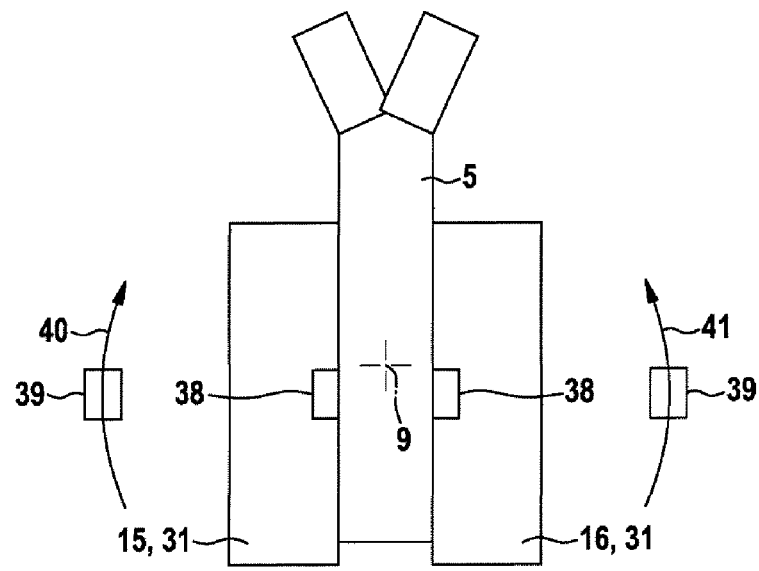
FIG. 3 shows, in a schematic illustration, the transverse guide of the jigsaw, actively adjustable about a preferably adjacent axis of rotation parallel to the longitudinal axis of the saw blade.

Transverse and/or torsional forces recorded by the measuring elements, for example by the measuring elements 38, 39, are processed as data in the computing unit 10 and are converted into positioning commands for the actuator system. The rotary movements, resulting therefrom, of the guide elements 15, 16 are illustrated in FIG. 3 as rotary movements about the longitudinal axis 9 of the saw blade 5 by the arrows 40, 41.

The useful range of rotation is relatively small. Corresponding angles of rotation are up to about 2°. In effect, the result of such a rotation of the saw blade 5 as a function of transverse force is that the "untrue running" of the saw blade 5, which as described above has been detected and recorded as transverse and/or torsional force, is corrected by corresponding rotation of the saw blade 5, such that the saw blade 5 again follows a predetermined specified course.

The solution according to the disclosure is explained above with regard to a reciprocating saw having a saw blade 5 that runs out freely, that is to say to a jigsaw of conventional design. In this jigsaw, the saw blade 5 is torsionally rigid about its longitudinal axis. The rotatability of the saw blade 5 is realized as a rule inside the drive arrangement which engages with the saw blade 5 and which comprises, for example, a reciprocating rod 36, shown in FIG. 5, and a saw blade receptacle 42 (FIG. 1) lying at the transition from the saw blade 5 to the reciprocating rod 36. In principle, within the limits of the slight deflections required, the torsionally rigid saw blade 5 can also be twisted within its elastic limits.

Figure 5:
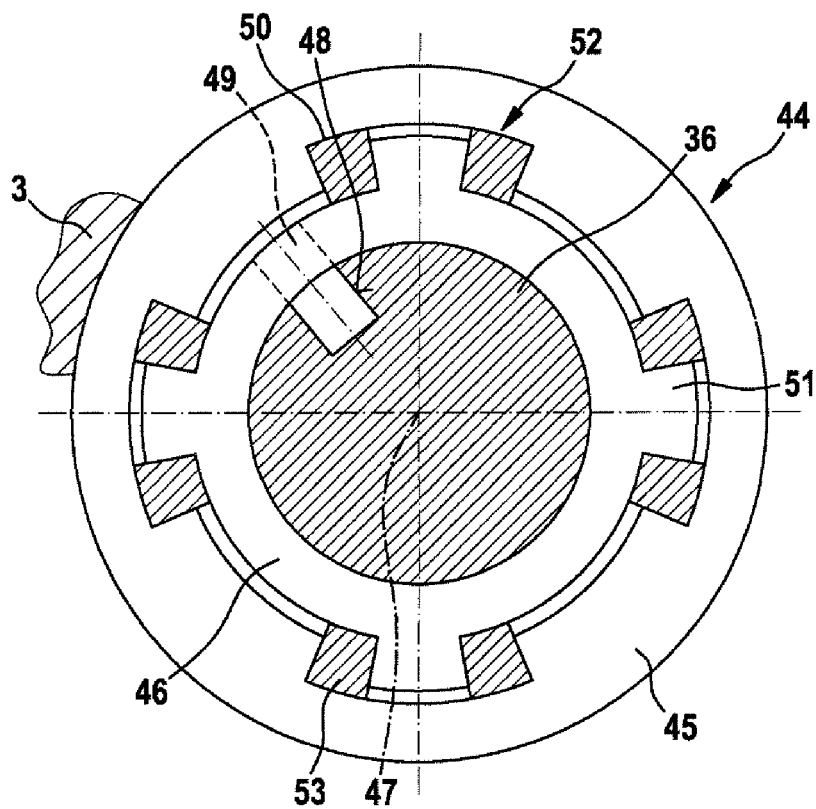
FIG. 5 shows a section through a reciprocating rod guide, in which the reciprocating rod is held in an axially displaceable manner and with a limited angle of rotation in the circumferential direction by an elastic support.

Such rotatability, which, as explained, only has to cover small angles of rotation, can be realized, for example, by an arrangement according to FIG. 5. The cross section shown there through the reciprocating rod 36 and a guide arrangement 44 for the reciprocating rod 36 comprises an outer guide ring 45, which is secured, for example, to the housing 3 and encloses an inner guide ring 46, wherein the guide rings 45 and 46, rotatable relative to one another, can be rotated relative to one another about the axis 47 of the reciprocating rod 36, and the inner guide ring 46 is secured in a rotationally fixed but longitudinally displaceable manner relative to the reciprocating rod 36. This rotationally fixed, but longitudinally displaceable connection between the inner guide ring 46 and the reciprocating rod 36 can be effected, for example, by a longitudinal groove 48 in the reciprocating rod 36 and by a guide pin 49 held in a fixed position in the inner guide ring.

The guide rings 45, 46 rotatable relative to one another have regions which overlap one another radially and which are formed by radial recesses 50 in the outer ring 45 and projections 51 on the inner guide ring 46, the projections 51 being shorter than the recesses 50 in the circumferential direction, such that spaces 52 lying in between in the circumferential direction are produced. The size of said spaces 52 determines the range of rotation, supporting bodies 53, in particular elastic supporting bodies 53, being arranged according to the invention in the spaces 52, as shown in exemplary embodiment 5, which supporting bodies 53 predetermine a basic orientation with respect to a central position, but allow a rotation as a function of torque, such that the saw blade 5 can be rotated with the reciprocating rod 36 via the guide elements 15, 16 in accordance with the application of transverse force to the saw blade 5.

Similarly, corresponding rotatability can also be realized in the saw blade receptacle.

Figure 4:
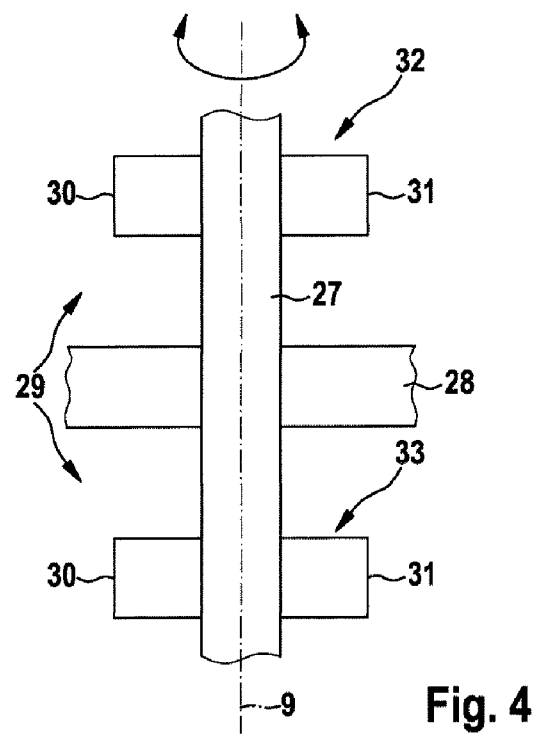
FIG. 4 shows a schematic illustration with respect to a band saw, in which a transverse support for the saw blade, band-shaped in this case, is respectively provided on each side of the machining area relative to a workpiece.

FIG. 4 shows in a schematic illustration, in a view of the back of the saw blade, a section of a saw blade 27 of a band saw, that is to say of a band saw blade in its region in which it passes through the workpiece 28. Transverse supports 32, 33 engaging with the saw blade 27 are provided on both sides of the workpiece 28 as parts of a transverse support 29, which are each formed by guide elements 30 and 31 lying on both sides relative to the saw blade 27. In accordance with the exemplary embodiment described above, said guide elements 30 and 31 can be rotated about the longitudinal axis 9 of the saw blade 27, or a correspondingly situated polar axis, such that, in the case of the configuration according to FIG. 4, the saw blade 27, which is more flexible in the transverse direction and is designed as a band, can be correspondingly rotated and oriented in the region in which it passes through the workpiece 28 in order to guide the cut in accordance with the specifications even in the case of a band saw.

The invention claimed is:

1. A jigsaw comprising:
a saw blade is defining a longitudinal axis;
a transverse guide configured to support the saw blade and to rotate the saw blade about the longitudinal axis in response to at least one of transverse and torsional forces acting on the saw blade during cutting;
a reciprocating rod; and
a saw blade receptacle configured to connect the saw blade to the reciprocating rod,
wherein the saw blade (i) is driven along the longitudinal axis with a reciprocating motion and (ii) is connected to the saw blade receptacle such that the saw blade is supported by the saw blade receptacle and is rotationally movable relative to the saw blade receptacle at the connection to the saw blade receptacle about the longitudinal axis within a predetermined angular range.

2. The power tool as claimed in claim 1, further comprising:
an elastic support configured to limit the rotation of the saw blade with respect to the saw blade receptacle to the predetermined angular range.

3. The jigsaw as claimed in claim 1, wherein the transverse guide is configured to twist the saw blade about the longitudinal axis in response to the at least one of the transverse forces and the torsional force acting on the saw blade.

4. The jigsaw as claimed in claim 3, wherein the transverse guide is configured to twist the saw blade in a direction opposite to the at least one of the transverse and the torsional forces acting on the saw blade.

5. The jigsaw as claimed in claim 1, wherein guide elements assigned to flat sides of the saw blade are configured to absorb the at least one of the transverse force and the torsional force.

6. The jigsaw as claimed in claim 5, wherein the guide elements include guide rollers.

7. The jigsaw as claimed in claim 6, wherein the guide elements include guide jaws.

8. The jigsaw as claimed in claim 5, wherein the guide elements engage with a flat side of the saw blade in a pincer-like manner.

9. The jigsaw as claimed in claim 5, wherein the guide elements include a force measuring element configured to measure and record the transverse force.

10. The jigsaw as claimed in claim 5, wherein the guide elements include a measuring element.

11. The jigsaw as claimed in claim 1, wherein the saw blade includes a band saw blade configured to be acted upon by the transverse guides at least on one side close to its working region.

12. A jigsaw comprising:
a saw blade defining a longitudinal axis; and
a transverse guide configured to support the saw blade and to rotate the saw blade about the longitudinal axis in response to at least one of transverse and torsional forces acting on the saw blade during cutting,
a reciprocating rod configured to support the saw blade;
a first guide ring and including a radial projection; and
a second guide ring including a radial recess into which the radial projection extends,
wherein the saw blade (i) is driven along the longitudinal axis with a reciprocating motion, and (ii) is supported rotationally movably about the longitudinal axis within a predetermined angular range,
wherein the reciprocating rod is supported rotationally movably about the longitudinal axis within the predetermined angular range and is biased toward a predetermined rotary position,
wherein one of the first guide ring and the second guide ring is rotationally fixed to the reciprocating rod, and
wherein the predetermined angular range is defined by movement of the radial projection within the radial recess.

13. The jigsaw of claim 12 further comprising:
a first elastic support positioned circumferentially between the radial recess and a first end of the radial projection configured to bias the reciprocating rod in a first rotational direction toward the predetermined rotary position; and
a second elastic support positioned circumferentially between the radial recess and a second opposite end of the radial projection configured to bias the reciprocating rod in a second opposite rotational direction toward the predetermined rotary position.

14. The jigsaw of claim 12 further comprising:
a force measuring element configured to detect at least one of a transverse force and a torsional force acting on the saw blade,
wherein the transverse guide is configured to support the saw blade in a rotatable manner about the longitudinal axis as a function of the detected at least one of the transverse force and the torsional force acting on the saw blade.

* * * * *